May 7, 1957 L. CHAPMAN 2,791,315
ARTICLE HANDLING MACHINE
Filed July 14, 1951 3 Sheets-Sheet 1
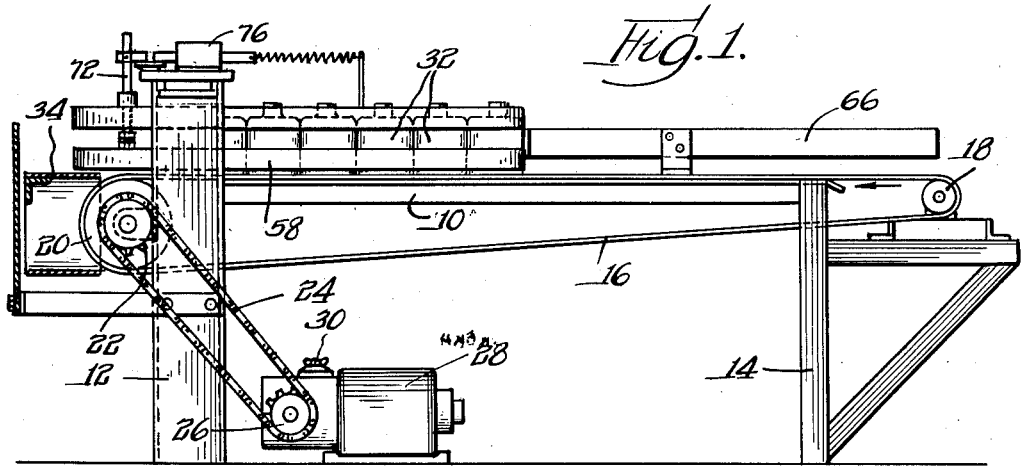
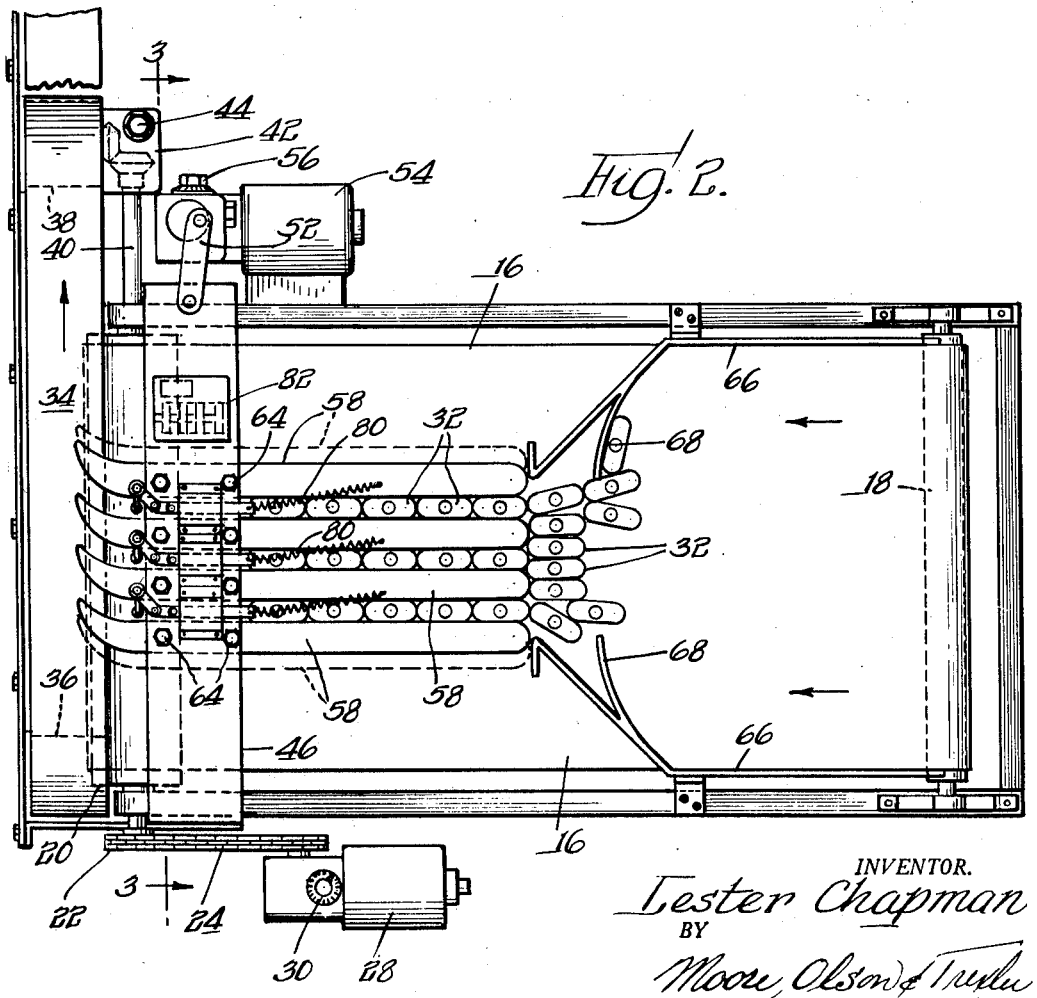
INVENTOR.
Lester Chapman
BY
Moore, Olson & Trexler
attys

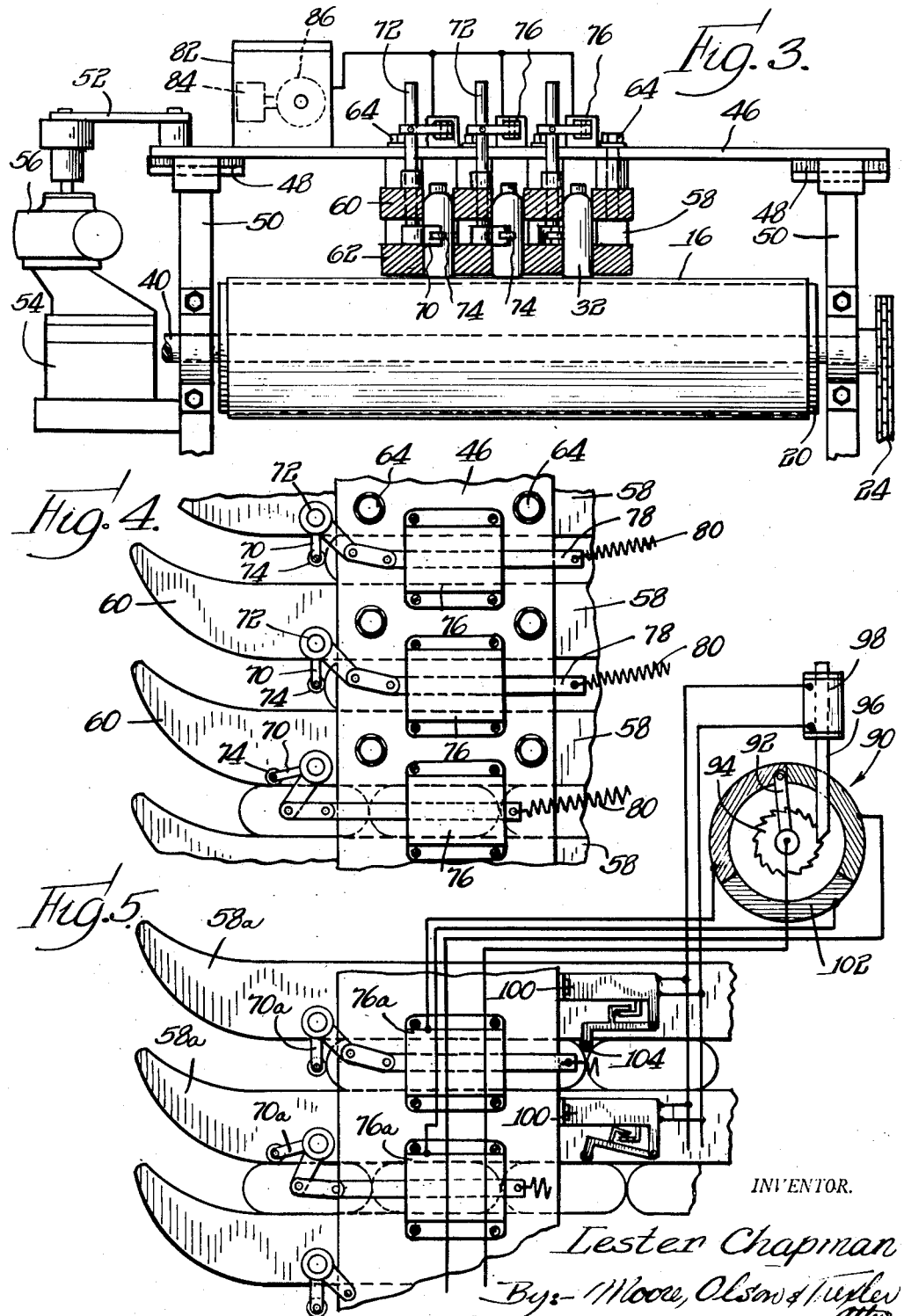

May 7, 1957 L. CHAPMAN 2,791,315
ARTICLE HANDLING MACHINE
Filed July 14, 1951 3 Sheets-Sheet 3
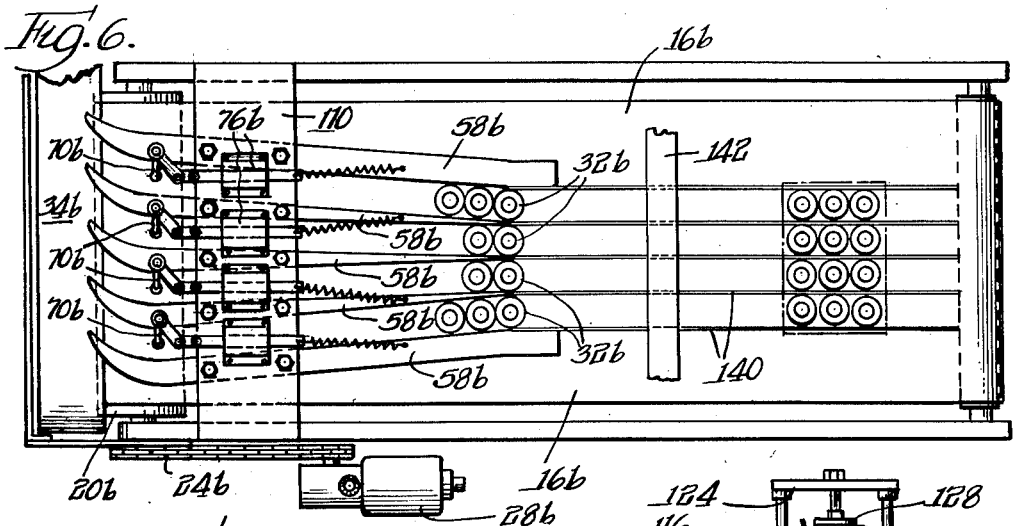
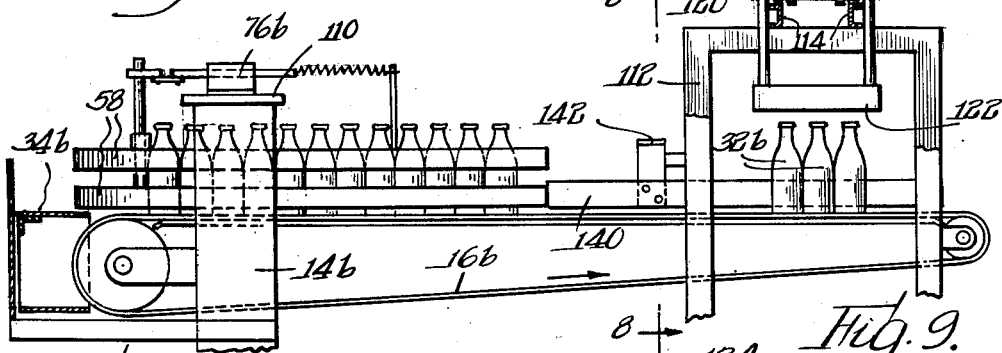
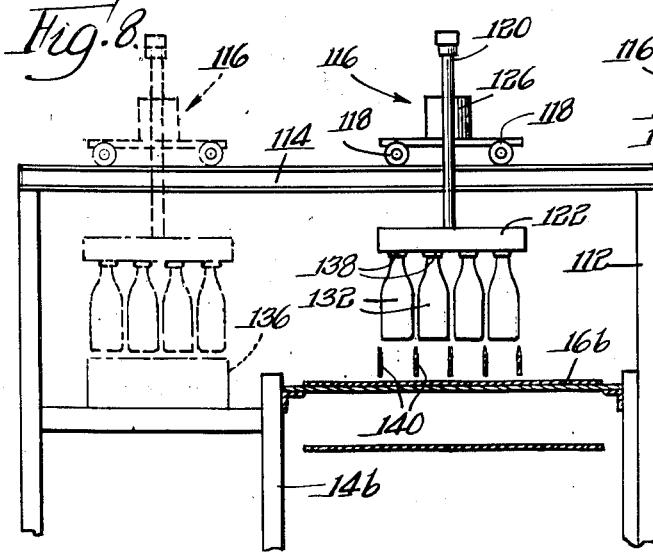
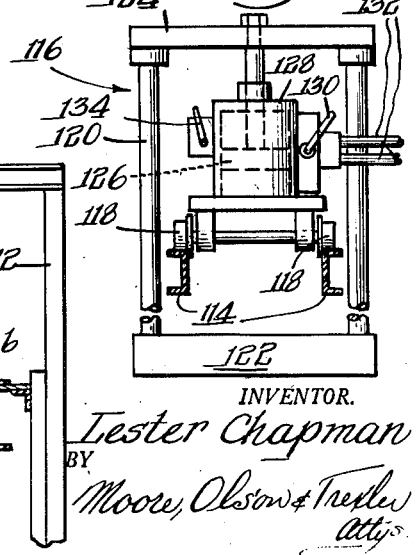
INVENTOR.
Lester Chapman
BY
Moore, Olson & Trexler
Attys

United States Patent Office 2,791,315
Patented May 7, 1957

2,791,315
ARTICLE HANDLING MACHINE

Lester Chapman, Rockford, Ill., assignor, by mesne assignments, to W. F. and John Barnes Company, Rockford, Ill., a corporation of Illinois Application July 14, 1951, Serial No. 236,736

7 Claims. (Cl. 198—32)

This invention relates to article handling mechanisms, and concerns particularly machines for rearranging articles such as containers, for presentation in single file or other desired arrangement for filling, labeling, or other processing.

In machines for unscrambling and rearranging articles, such for example as containers or the like, it is desirable that the articles be handled at high speed, and with a minimum of jamming and breaking. Machines heretofore developed, while satisfactorily operable upon containers of certain sizes and types, present difficulties when used with containers of other sizes, and special shapes. Also, the material of which the container or article is made presents difficulty in handling at high speed. Thus glass, under certain moisture conditions, is difficult to handle, when the glass articles are brought into rubbing contact; and at high speed jamming or breaking of the frangible containers is likely to result.

In accordance with the present invention an article handling machine is provided, for the high speed refiling or rearranging of articles, such as containers; wherein means is incorporated for programming the articles in their movement to enhance permissible speeds in operation, minimize breakage, and prevent jamming. The machine, in one form, also contemplates an improved feeding mechanism.

It is an object of the invention to provide an article handling machine, of the type defined, of improved construction and improved operating characteristics.

More specifically stated, it is an object of the present invention to provide an article handling machine, for refiling or rearranging articles such as containers, which is operable at high speed, and which is adapted for the handling of articles of various shapes and size, and of various surface materials, without the jamming or breaking thereof.

A further object of the invention is to provide an improved article handling machine, of the type defined, which includes programming mechanism for facilitating the movement of the articles through the machine, and for directing the movements thereof to minimize jamming.

A still further object of the invention is to provide in a machine of the type defined, an improved machine loading mechanism.

Various other objects, advantages and features of the present invention will be apparent from the accompanying specification and drawings, wherein certain preferred embodiments of the invention are set forth for purposes of illustration.

In the drawings wherein like reference numerals refer to like parts throughout:

Fig. 1 is a general assembly view, in side elevation, of an article handling machine constructed in accordance with and embodying the principles of the present invention, in accordance with one selected embodiment thereof;

Fig. 2 is a plan view of the machine of Fig. 1;

Fig. 3 is an enlarged transverse sectional view of the machine of Figs. 1 and 2, taken as indicated by the line 3—3 of Fig. 2;

Fig. 4 is a partial plan view, on a further enlarged scale, of a part of the mechanism shown in Fig. 3;

Fig. 5 is a view similar to Fig. 4, but illustrating a modified embodiment;

Fig. 6 is a plan view of a machine, embodying the principles of the invention, in accordance with a further embodiment thereof;

Fig. 7 is a partial side view of the machine of Fig. 6;

Fig. 8 is a transverse sectional view of the machine of Figs. 6 and 7, on the line 8—8 of Fig. 7, and more particularly illustrating the loading mechanism and associated parts; and Fig. 9 is an enlarged detail view of the loading unit, as embodied in the machine of Figs. 6-8.

In the drawings, the machine of the invention has been shown applied to the unscrambling and rearranging of containers, to which the invention in certain of its aspects is particularly adapted. It is to be understood, however, that handling may be effected of articles of various types and kind, including containers of various size, material and shape, in connection with the filling or processing thereof.

The invention relates to machines of the general type and kind shown in the copending application of Wallace M. Parry, Serial No. 14,073, filed March 10, 1948, now Patent No. 2,646,870, upon which the machine of the present invention constitutes an improvement.

Referring more particularly to the drawings, and first to the embodiment of the invention illustrated in Figs. 1-4, in Figs. 1 and 2 there is shown a machine for the unscrambling and single filing of containers, such as irregularly shaped glass bottles, comprising the main bed or table 10 supported by front and rear supports 12 and 14, respectively.

Movable longitudinally across the frame bed of the machine, from the rear toward the front thereof, is an endless belt or chain 16, the belt having a width substantially equal to the width of the bed frame, for maximum handling capacity. The belt 10 is guided at its rear end over an idler roll 18 and is guided and driven at its front end by a drive roller 20 to which a driving sprocket 22 is secured. The sprocket is driven by a chain 24 in turn driven by a motor drive sprocket 26 associated with an electric drive motor 28. Suitable speed adjusting mechanism is provided as indicated at 30 so that the driving speed of the endless belt or chain 16 may be variably controlled. It will be seen that by reason of the drive connections provided, as the motor 28 is operated, the endless belt 16 is continuously driven in a manner to frictionally propel articles, such as the bottles 32, forwardly of the machine bed, or to the left as seen in Figs. 1 and 2.

At the forward end of the machine, and movable transversely thereof, there is provided an endless chain or belt 34, guided at its ends over an idler roll 36 and a drive roll 38, and operable to receive the bottles from the supply belt 16, and to transfer them from the machine to a desired point of delivery. The means for effecting movement of the transverse delivery belt 34, in timed relation with the movements of the suply or main belt 16, comprises a drive shaft 40 movable with the drive roll 20, and arranged by means of suitable gearing within the gear box 42, to effect the operation of the transverse belt drive roll 38. Preferably change speed mechanism is provided within the gear box 42, as indicated at 44, so that the relative speed of the belts 16 and 34 may be varied, as desired. It will be seen that by reason of the connections provided, the drive motor 28 effects operation of both belts, simultaneously, but at variously proportioned speeds.

Means for transferring bottles from the belt 16 onto the delivery belt 34, in desired single file arrangement in the particular embodiment set forth, will now be described.

A reciprocating head 46 extends transversely across the machine at the forward end thereof, in predetermined spaced relation above the belt 16, said head being slidable by means of slides 48, Fig. 3, provided at its opposite ends, slidable in the machine support pedestals 50. The head is reciprocable by a crank arm 52 driven from an electric drive motor 54 through the action of a variable speed mechanism 56 so that the reciprocating speed of the head may be variably controlled.

The head 46 carries a plurality of guide bars 58, there being four such guide bars illustrated in the particular embodiment disclosed. As best shown in Fig. 3, each guide bar more specifically comprises an upper bar member 60 and a lower bar member 62, in spaced relation and movable as a unit at all times. The guide bars are rigidly supported from the head 46, by suitable means such as bolts 64, Figs. 2 and 4, so that the bars and head reciprocate as a unit transversely of the belt 16, a predetermined distance determined by the throw of the crank 52. Preferably the adjustment means 56 in the drive connections for the head further includes means for adjusting the throw of the crank pin, so that the reciprocating range of travel of the head 46 may be adjustably controlled.

Means is provided for guiding the bottles between the guide bars 58, such means in the particular embodiment set forth being in the form of frame side bars 66, Fig. 2, the forward ends 68 of which are disposed so as to guide the bottles, under the frictional urging action of the supporting belt 16, between the guide bars 58. The continuous reciprocating movements of the bars 58, as the bottles are guided and urged against the ends thereof, aid in causing the bottles to gravitate and slide into position between the bars, to the positions shown.

In accordance with the present invention, timing or program mechanism is provided for predetermining the movement of the bottles between the bars 58, to minimize and preclude breakage of the bottles, as they are delivered onto the belt 34. As best shown in Figs. 3 and 4, a gate 70 is provided between each pair of the bars, the gates being secured to rock shafts 72 journalled in the bar members. In Figs. 3 and 4 two of the gates 70 are shown in closed or blocking position, whereas the third gate, to the right in Fig. 3 and at the bottom of Fig. 4, is shown open to permit bottle movement. Each gate carries a roller 74 on its end, constituting the bottle contacting member, for a purpose presently to be described.

Means is provided for operating the gates comprising a solenoid 76 for each gate, the armatures 78 of which are connected by suitable linkage with the rock shafts 72, respectively, so that as each solenoid is energized, the gate associated therewith is opened. A tension spring 80, Fig. 2, is connected with each armature, so that the armatures are normally held retracted, or to the right as seen in Figs. 2 and 4, to hold the gates closed.

The solenoids are energized in a sequential program from a timer mechanism 82, of suitable design, and preferably comprising a synchronous motor 84 and a series of cams 86 for operating contacts, respectively, associated with the electromagnets 76 so that the latter are energized in predetermined sequence. Optimum results are generally secured by so arranging the timing cams that the solenoids are sequentially energized, one solenoid being energized at a time, and a short time interval being provided between the deenergizing of one solenoid and the energizing of the next, in a manner so as to minimize interference of bottles coming from between different sets of guide bars.

It will be seen that by reason of the arrangements thus provided, the bottles move through the passages provided between adjacent guide bars 58, in sequence, and through only one passageway at a time. In this manner only one line of bottles is transferred from between the guide bars onto the delivery belt 34 at any one time, minimizing interference, jamming, and bottle breakage. It has been found that with the arrangements thus provided extremely high speed operation may be secured, the mechanism expeditiously handling hundreds of bottles per minute in transfer from the supply belt 16 onto the delivery belt 34, in a desired single file arrangement.

The time interval during which the gate is closed between any pair of guide bars, permits such passageway to become completely filled with bottles awaiting movement, and this action is facilitated by the reciprocation of the head 46, so that when the gate is opened it is insured that a full quota of bottles will be transmitted. In this manner substantially the full capacity of the machine is utilized, even though only one gate is open at a time. As will be understood, the programming of the timing switch may be adjusted as desired, in a proper instance to permit two gates to open simultaneously, as for example if it is desired to transfer two lines of bottles onto the delivery belt, or otherwise as may be desired.

The rollers 74, coupled with the actions of the retraction springs 80, render the action of the timing cams 86 non-critical, viz., if a gate should be released to close by the deenergizing of its associated electromagnet, while a bottle is passing therethrough, the roller 74 permits the continued movement of the bottle engaged by the closing gate, unimpeded and without jamming, until such bottle passes the gate, whereupon the gate is automatically closed by its associated spring to block the following bottle. In this manner jamming is precluded at or by the closing of the gates.

As pointed out in said application of Wallace M. Parry, above mentioned, the forward of delivery ends of the bars 60 and 62 are preferably of a curved shape, as shown, to facilitate the movement of the delivery articles onto the delivery belt.

By reason of the mechanisms provided articles may be expeditiously handled, at high speed, including glass containers of irregular shape, under varying moisture conditions rendering the exterior glass surfaces "sticky" or abrasive in character.

In certain instances it may be desirable to insure, more accurately, the passage of a predetermined number of the containers through each passageway, so as to effect a counting thereof, or to more positively insure that a gate shall not be closed during the transmission of a bottle therethrough. Such a mechanism is illustrated in Fig. 5.

In this instance the solenoids 76a controlling the gates 70a, corresponding in structure and function with the similarly numbered parts in the embodiment previously described, are controlled from the timer or control mechanism generally indicated by the reference numeral 90. More specifically, this control mechanism comprises a rotary contact arm 92 secured to a ratchet 94, the operating pawl 96 of which is arranged for actuation by a solenoid 98. This solenoid is connected with a series of switch devices 100, there being one switch for each bottle passageway, and the arrangement being such that the operation of any switch operates the electromagnet 98.

The rotary contact arm 92 cooperates with a stationary sector plate 102 the various sections of which are insulated one from the other and connected, respectively, and individually to the solenoids 76a.

In the operation of the structure it will be seen that one of the switches 100 will be operated as a bottle passes through any of the passageways, thus imparting one increment of movement to the rotary contact arm 92. So long as the contact arm remains in contact with one sector, its associated electromagnet 76a will remain energized to maintain one passageway open. As the rotary contact arm 92 moves away from one sector and onto the next, the previously energized solenoid 76a will be deenergized and the next solenoid energized, in sequence, for the general purposes heretofore described in reference to the embodiment of the invention set forth in Figs. 1–4. However, it will be seen that in accordance with the structure of Fig. 5, due to the fact that each contact of the sector 102 is of given length in relation to the ratchet 94, the control mechanism will effect a counting of the bottles, viz., each passageway will in turn remain open to effect the transmission of a given or predetermined number of bottles, whereupon the next passageway is opened. Also, it will be seen that the shift of the gates 70a occurs at a predetermined time in respect to the position of the bottles, due to the physical positioning relationship between the gate and the switch device 100. More particularly, as the switch drops between the bottles, as shown at 104, the contact arm 92 moves from the first sector to the second, to effect the shifting of the gates. The gate is thus closed at a predetermined time with respect to the movement of the bottles, so that the closing of the gate does not tend to inhibit or interfere with bottle movement in an unwarranted manner.

In Figs. 6–9 a further embodiment of the invention is illustrated wherein the principles of the invention are shown applied in the handling of bottles of more conventional shape. Also, in this instance the bottles are fed to the machine, in predetermined pattern, and the reciprocation of the guide bars during the feeding is eliminated.

Referring to Figs. 6 and 7, it will be seen that the machine comprises a main belt 16b, of the type and kind heretofore described, propelled by a suitable drive motor as indicated at 28b by means of a transmission chain 24b and a drive roll 20b. Driven in synchronism with the main belt is an auxiliary or delivery belt 34b, functioning in a manner heretofore described.

In this instance the cross bridge from which the guide bars are supported comprises a stationary bridge member 110, and the guide bars 58b are divergingly disposed with at least the central bars being of converging cross section, so as to provide a plurality of diverging pathways for the bottles as indicated at 32b. The forward ends of the passageways are controlled by gates 70b operated by electromagnets 76b as heretofore described.

In this instance feeding means is provided, for feeding the bottles onto the main belt 16b in predetermined pattern. As shown in Figs. 7 and 8 the rear portion of the machine is provided with a bridge frame 112, the upper cross portion of which is formed as a pair of track members 114.

The loading unit, generally indicated by the reference numeral 116, is transversely movable on the tracks 114, and is provided with wheels 118 for such purpose. The loading unit specifically comprises a frame 120, the lower portion of which is formed as an electromagnet 122, and the upper portion of which is formed with a frame piece 124 from which is suspended a piston 126 operable within an air cylinder 128. The lower end of the air cylinder carries the wheels 118, by which the loading unit is supported for bodily shifting on the tracks 114 transversely of the belt 16b as will be understood.

An air valve 130, Fig. 9, is provided for controlling the admission of air to the cylinder, from supply and exhaust lines 132, in a manner so that as the valve is manually shifted in one direction the piston is raised within the cylinder, to raise the electromagnet 122 relative to the support tracks 114; and when the valve is shifted in the opposite direction the piston is lowered to effect the lowering of the electromagnet member.

The unit is further provided with a manually operable switch 134 for controlling the energization of the electromagnet.

It will be seen that by the manipulation of valve 130 and switch 134, coupled with the movement of the loading unit along the tracks 114, a case of bottles may be withdrawn from the carton 136, as shown in dotted lines in Fig. 8, and moved to a position, as shown in full lines; and then deposited onto the belt 16b, while maintained in the predetermined pattern in which the bottles were disposed while in the packing carton. To this end, in the particular embodiment shown, the bottles are provided with metal caps as indicated at 138 to permit the holding thereof by the electromagnet 122. In instances wherein the bottles are not provided with metal caps, suitable gripping devices may be associated with the loading unit, as will be understood.

As best shown in Figs. 6 and 8, a series of spacing and guiding plates 140 is provided between which the bottles are placed by the loading unit, these plates being aligned with the ends of the guide bars 58b, so as to provide continuous aligned passageways for the bottles in their movements along the belt 16b. The plates 140 are supported by a cross bridge 142, or otherwise as may be desired.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. An article handling machine comprising an infeed conveyor, a discharge conveyor movable transversely of the infeed conveyor, transfer mechanism for transferring articles between the conveyors comprising means forming a plurality of generally parallel elongated transfer passages between the conveyors, each of said passages being sufficiently long to contain a series of articles, a gate member for each passage for controlling the passage of articles therethrough, a switch for each passageway operated by the movement of the articles therethrough, a program switch operated by the article switches, and means operated by the program switch for actuating the gate members in predetermined sequence for opening one gate member to allow a plurality of articles to pass before said one gate member is closed while other gate members remain closed to allow their associated passages to be filled with articles.

2. An article handling machine as claimed in claim 1, wherein means is provided for reciprocating the transfer members laterally of the passages through a predetermined range of travel during operation of the machine.

3. An article handling machine as claimed in claim 2, wherein means is provided for adjusting the speed of operation of said reciprocating means.

4. An article handling machine as claimed in claim 2, wherein there is provided means for adjusting the range of travel of said reciprocating machine.

5. An article handling machine as claimed in claim 1, wherein the program switch includes a ratchet device and switch arm operated by the article switches.

6. An article handling machine as claimed in claim 5, wherein the switch arm is movable over a plurality of switch sectors, each sector being in operative association with the actuating means for the gate of a corresponding separate passage.

7. An article handling machine as claimed in claim 1, wherein the actuating means for each gate includes a solenoid, and wherein the program switch includes a plurality of switch sectors, one electrically connected to a corresponding solenoid, and a switch arm movable over the switch sectors in response to said article switches to operate the solenoid for each gate in predetermined sequence.

References Cited in the file of this patent

UNITED STATES PATENTS 861,383   Moorshead _____ July 30, 1907

(Other references on following page)

UNITED STATES PATENTS

| | | |
|---|---|---|
| 930,673 | Manischewitz | Aug. 10, 1909 |
| 1,612,444 | Kimball et al. | Dec. 28, 1926 |
| 1,800,898 | Nelsen | Apr. 14, 1931 |
| 1,904,720 | Douglass | Apr. 18, 1933 |
| 2,415,941 | Edson | Feb. 18, 1947 |
| 2,466,693 | Fischer | Apr. 12, 1949 |
| 2,576,369 | Sticelber | Nov. 27, 1951 |
| 2,603,340 | Warren | July 15, 1952 |
| 2,646,870 | Parry | July 28, 1953 |
| 2,707,571 | Smith | May 3, 1955 |